United States Patent [19]

Boutet et al.

[11] Patent Number: 5,184,013
[45] Date of Patent: Feb. 2, 1993

[54] DIFFUSE LIGHT COLLECTOR WHICH MINIMIZES STREAK ARTIFACTS

[75] Inventors: John C. Boutet; Thomas E. Kocher, both of Rochester, N.Y.

[73] Assignee: Eastman Kodak Company, Rochester, N.Y.

[21] Appl. No.: 733,800

[22] Filed: Jul. 22, 1991

[51] Int. Cl.⁵ ............................ H01J 3/14; G01J 1/04
[52] U.S. Cl. ...................................... 250/236; 356/236
[58] Field of Search ................. 356/236; 250/236, 235, 250/228

[56] References Cited

U.S. PATENT DOCUMENTS

| | | | |
|---|---|---|---|
| 2,821,103 | 1/1958 | Blet . | |
| 3,327,583 | 6/1967 | Vanderschmidt et al. . | |
| 3,648,056 | 3/1972 | Buttweiler et al. | 250/239 |
| 4,568,984 | 2/1986 | Juergensen et al. | 358/293 |
| 4,660,984 | 4/1987 | MacDonald | 356/236 X |
| 4,818,861 | 4/1989 | Horiuchi et al. | 250/235 |
| 4,868,383 | 9/1989 | Kurtz et al. | 250/228 |

Primary Examiner—David C. Nelms
Assistant Examiner—K. P. Hantis
Attorney, Agent, or Firm—William F. Noval

[57] ABSTRACT

A laser film scanner scans film as it is translated in a substantially horizonally plane past a diffuse light collector. The light collector includes an elongated housing enclosing a collection cavity having a slot at its top through which light enters. The cavity has diffuse reflective surfaces to diffusely reflect light to a photodetector communicating with the cavity. Positioned opposite the slot is a slanted face from which light entering the cavity is directly reflected. The slanted face avoids streak artifacts in a detected image by permitting dirt particles falling through the slot to roll down to a lower region in the cavity. The slaned face may be formed from a removable insert of low adhesion fluorocarbon material to permit cleaning without disassembling the collector.

3 Claims, 5 Drawing Sheets

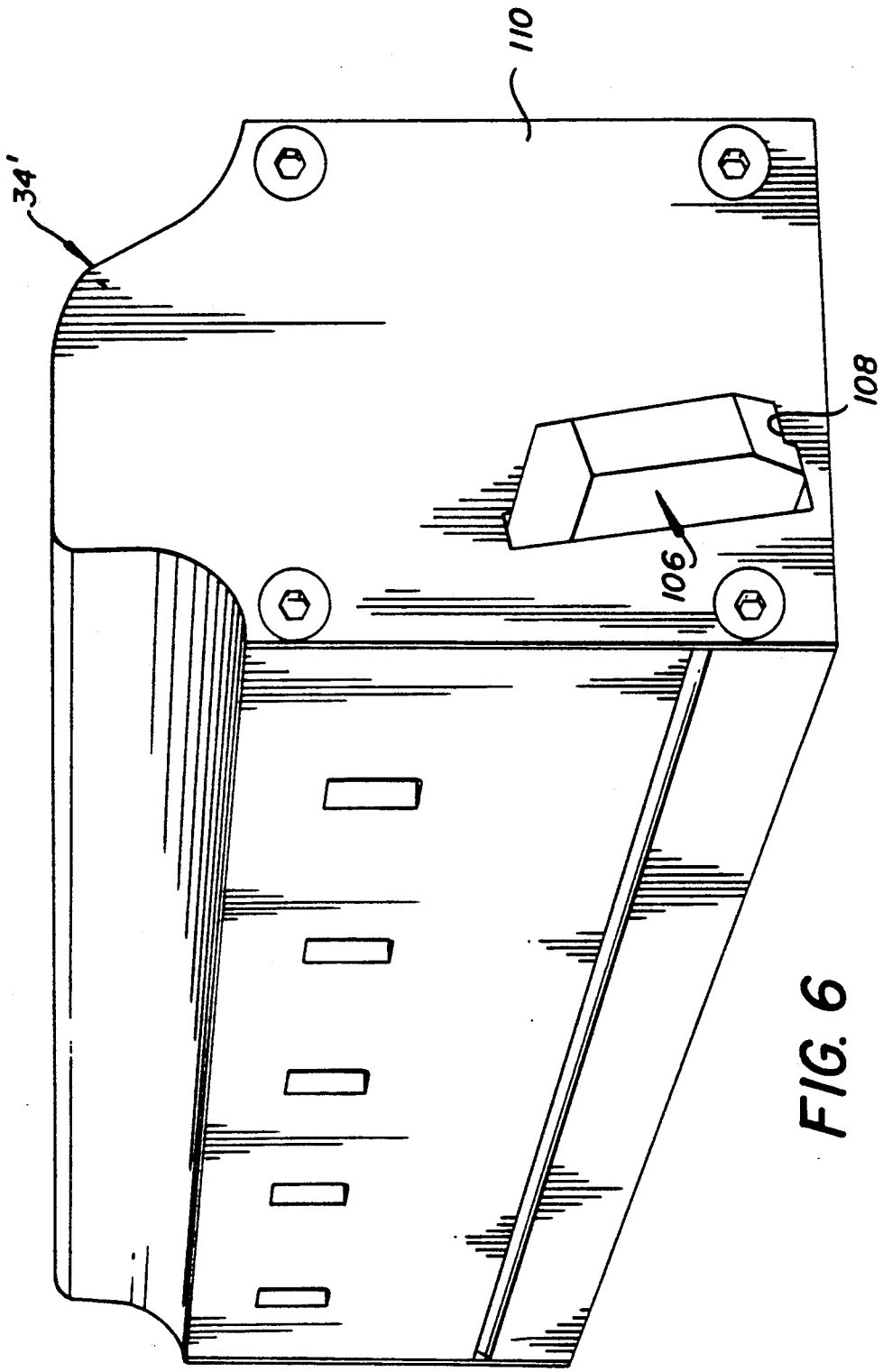

5,184,013

DIFFUSE LIGHT COLLECTOR WHICH MINIMIZES STREAK ARTIFACTS

FIELD OF INVENTION

This invention relates in general to apparatus for scanning an information medium and more particularly to laser scanning apparatus including a light collector which reduces image artifacts caused by dirt collecting on collector surfaces.

BACKGROUND OF THE INVENTION

In conventional film/screen radiography, an x-ray image is formed on film by exposing an object (such as a patient body part) to a source of x-rays.

The developed film is then used by a physician for diagnostic purposes. In order to facilitate computer processing of an x-ray image on film, the film is digitally scanned to produce a digital x-ray image. The digital image can be processed, stored, transmitted to remote locations and displayed on a video monitor. One type of digital film scanner uses a laser to produce a laser beam which is scanned in a line across an information medium, such as radiographic film, as the medium is translated in a direction perpendicular to the line scan direction. Light transmitted or reflected from the film is collected and converted to an electrical image signal by a photodetector.

Laser film scanners are disclosed in U.S. Pat. No. 4,818,861, issued Apr. 4, 1989, inventors Horiuche et. al. and U.S. Pat. No. 4,568,984, issued Feb. 4, 1986, inventors Juergensen et. al. The latter patent discloses the use of a cylindrical diffuse light collector located below a horizontally translated film which is scanned with a laser beam. The collector has a slot for receiving transmitted light into the collector cavity where the light is diffusely reflected to a photodetector. Such a collector is disadvantageous since dirt can enter the collector cavity through the light collecting slot. Gravity pulls dirt onto the surface area of the cavity which the laser beam first strikes after passing through the film. Large particles of dirt will result in a streak artifact in the image if the dirt reflectivity is different than the diffusely reflective surface of the collector cavity.

U.S Pat. No. 2,821,103, issued Jan. 28, 1958, inventor B. C. F. Blet; U.S. Pat. No. 3,327,583, issued Jun. 27, 1967, inventors G. F. Vanderschmidt et. al.; U.S. Pat. No. 3,648,056, issued Mar. 7, 1972, inventors T. B. Buttweiller et. al.; U.S. Pat. No. 4,868,383, issued Sept. 19, 1989, inventor A. F. Kurtz et. al., disclose various configurations of light integrating assemblies which do not solve these problems.

It is thus desirable that such streak artifacts be eliminated. It is also desirable that the light collector have high light collection efficiency, be easy and economical to manufacture and be configured so that photodetectors are shaded from scattered transmitted light.

SUMMARY OF THE INVENTION

According to the present invention, there is provided a diffuse light collector which has high light collection efficiency, which is economical and easy to manufacture, which blocks scattered transmitted light from photodetectors and which minimizes streak artifacts caused by dirt.

According to an aspect of the present invention, a diffuse light collector is provided which minimizes image artifacts resulting from accumulated dirt particles in the collector cavity.

According to a another aspect of the present invention, a diffuse light collector is provided which includes a removable insert of low adhesion material, such as fluorocarbon, which can be easily removed for cleaning. The insert is positioned within the collector to receive directly transmitted light.

BRIEF DESCRIPTION OF THE DRAWINGS

FIG. 6 is a perspective view of the embodiment of FIG. 5.

DESCRIPTION OF THE PREFERRED EMBODIMENTS

Figure 1:
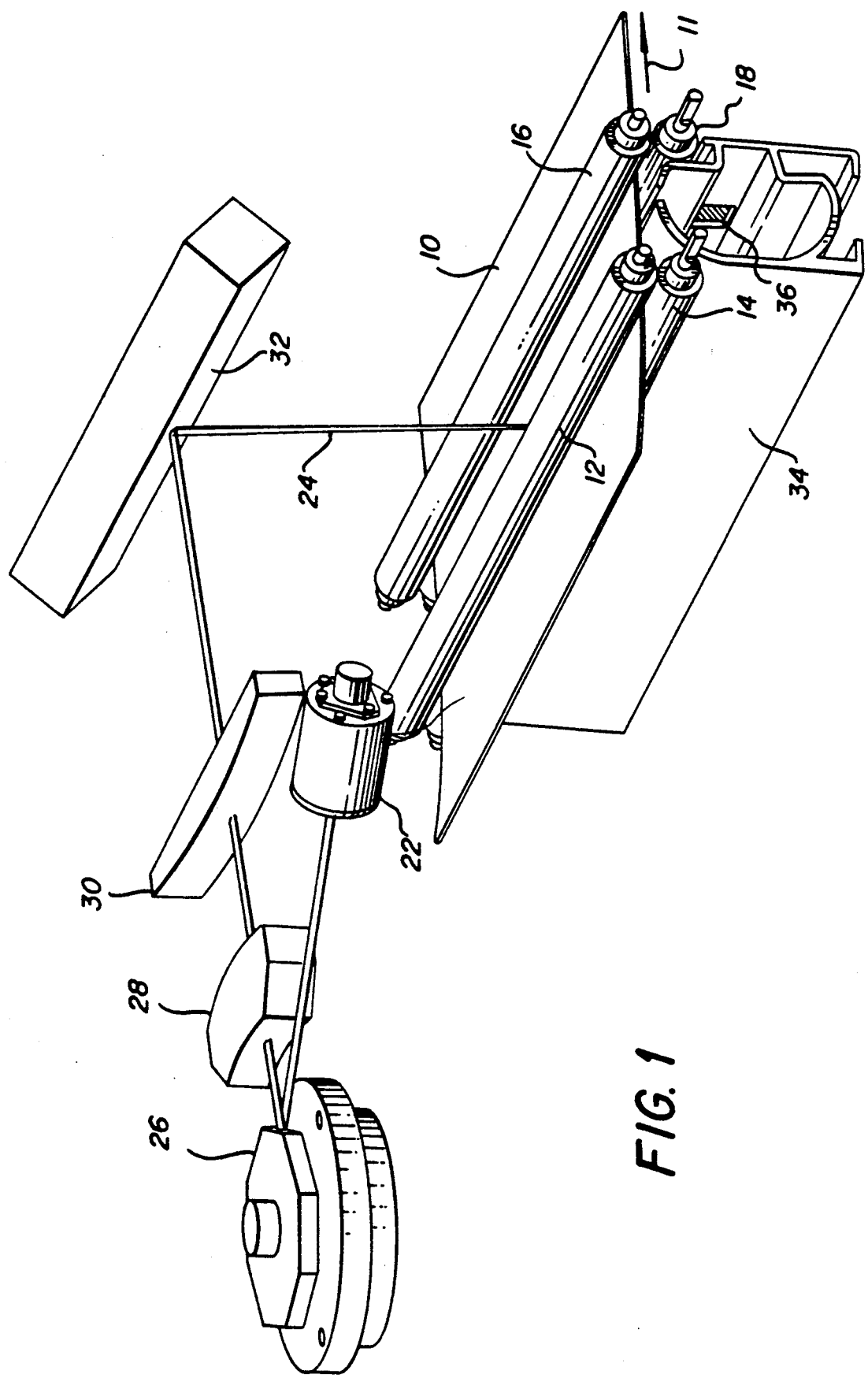
FIG. 1 is a perspective view of laser scanning apparatus.
Figure 2:
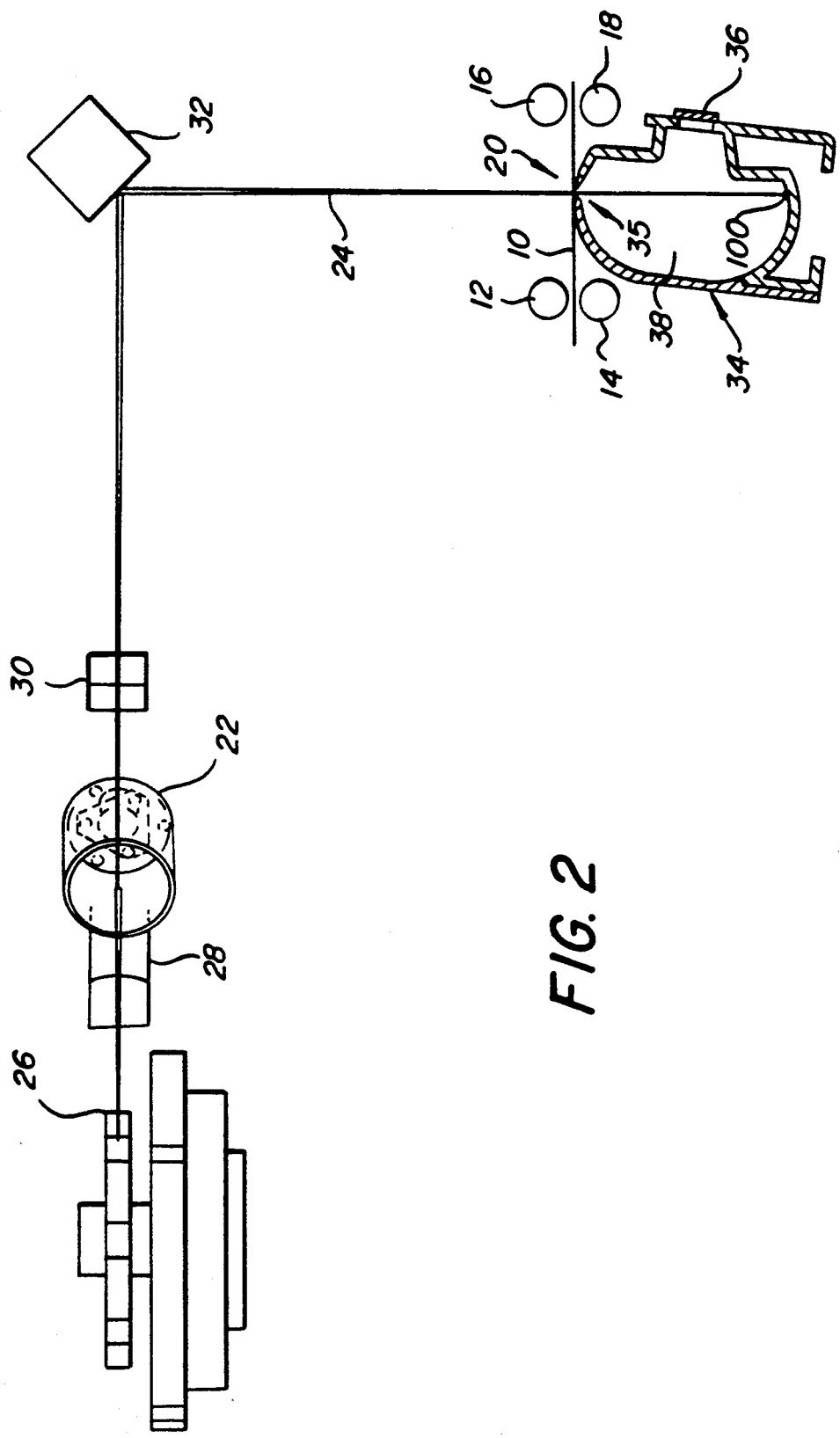
FIG. 2 is a side elevational view of the apparatus of FIG. 1.

Referring now to FIGS. 1 and 2, there is shown laser scanning apparatus. As shown, film 10 is moved in a substantially horizontal direction by means of roller pairs 12, 14, and 16, 18 past a laser beam scanning and light collection region 20. A laser 22 s produces a laser beam 24, which is scanned across the width of film 10 in a scanning line direction by means of rotating polygon mirror 26, scan optic elements 28 and 30 and mirror 32. Scan optic elements 28 and 30 shape the laser beam to a desired size and shape and correct for Fθ distortion as the beam is scanned across film 10. Laser 22 may, for example, be a gas laser (such as a helium neon laser, argon laser), or may be a solid state laser (such as a semi-conductor laser emitting light in the infra red or near red wavelengths).

As film 10 is moved in direction 11, laser beam 24 is scanned across an image on film 10 in a raster. Light transmitted through film 10 is collected by means of a diffuse collector 34 and detected by one or more photodetectors 36 communicating with the light collection cavity 38 of collector 34.

Figure 3:
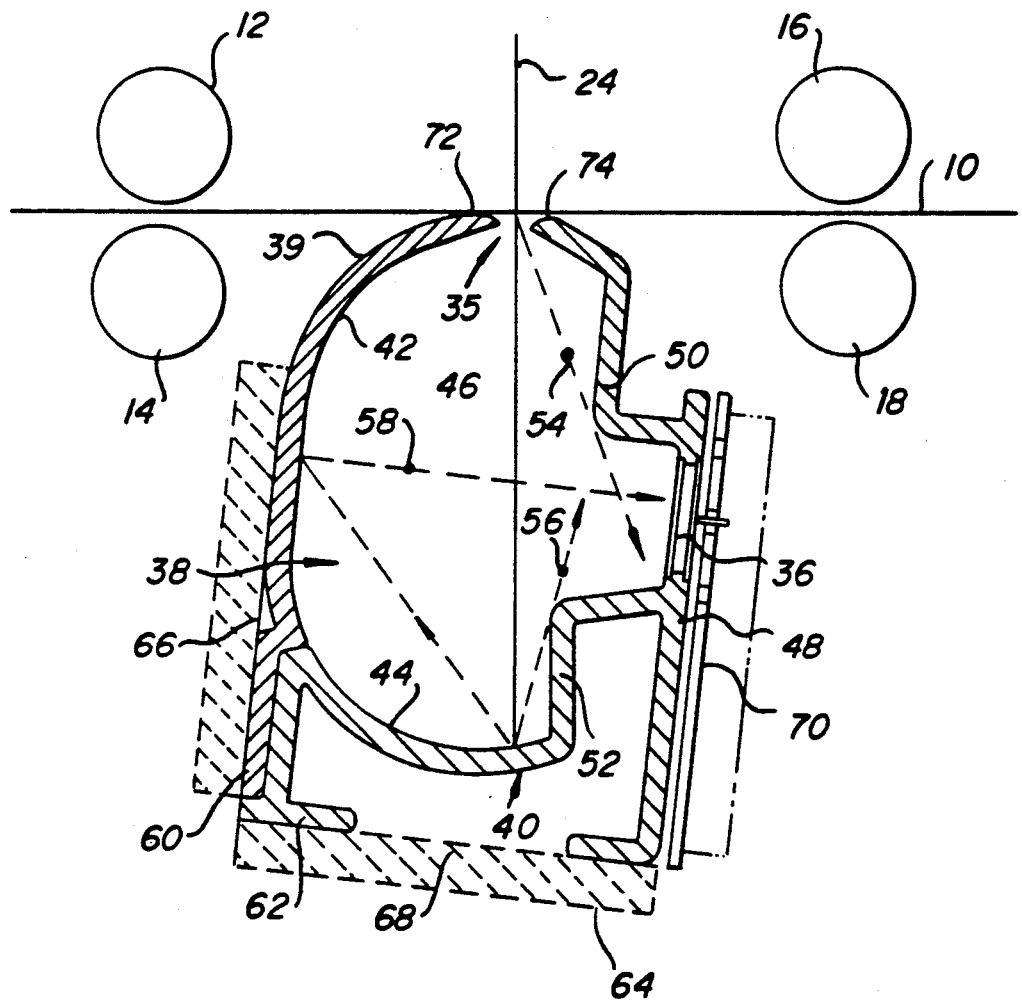
FIG. 3 is an elevational view of the collector of FIG. 1.

As shown in greater detail in FIG. 3, collector 34 includes elongated members 39 and 40 which are joined together to form cavity 38. The respective interior surfaces 42 and 44 of members 39 and 40 are of diffusely reflective material so that 46 transmitted through film 10 is reflected several times before reaching photodetector 36. Member 40 includes a recessed segment 48 which mounts photodetectors 36. Baffle segments 50 and 52 of member 40 prevent scattered transmitted light 54 and once reflected light 56 from impinging directly on photodetector 36. Segments 50,52 extend the length of collector 34. This is illustrated in FIG. 3. Whereas directly transmitted light ray 54 is blocked by baffle segment 50 and first reflected light ray 56 is blocked by baffle 52, doubly reflected light ray 58 reaches photodetector 36. Light ray 58 is more diffusely reflected than direct light ray 54 and singly reflected light ray 56 to provide more uniform light collection.

Members 39 and 40 are provided with respective extensions 60, 62 and 64 which are used for mounting collector 34 to frame members 66 and/or 68 of a laser imaging apparatus, and for mounting printed circuit board 70 to extension 64 of member 40. Board 70 supports electronic circuitry for photodetector 36.

Members 39 and 40 are formed of extrudable material, such as aluminum. Individual lengths of material are severed from longer lengths of extruded aluminum material. Thus the collector 34 is economical and easy to manufacture.

The upper ends 72 and 74, respectively, of members 39 and 40 of collector 34 form slot 35 for collecting transmitted light from film 10. The outer faces of ends 72 and 74 are arcuate in shape to provide film guiding in the region of slot 35 so that film 10 is scanned in a flat region for effective image detection.

Figure 4:
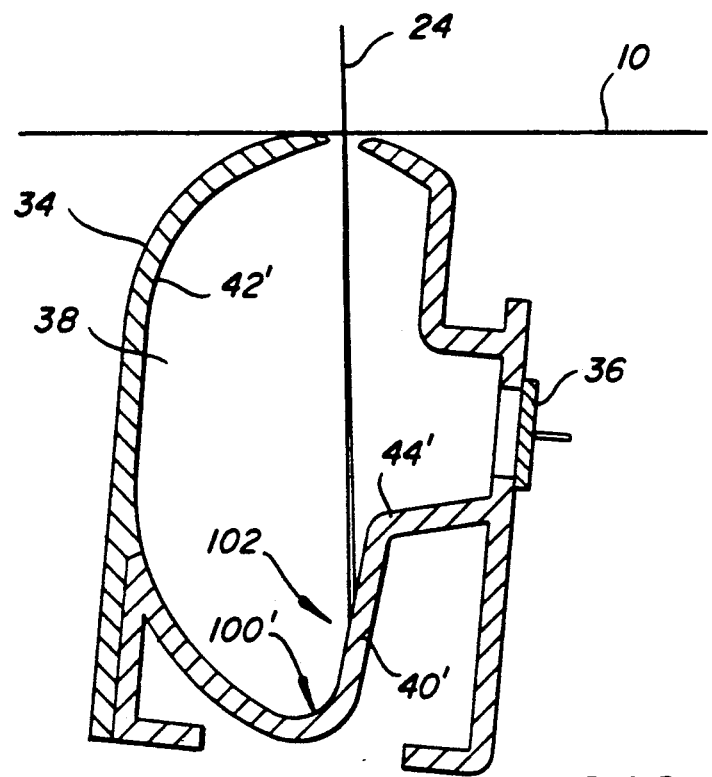
FIGS. 4 and 5 are respective elevational views of embodiments of the present invention for reducing image artifacts from accumulated dirt.

Referring now to FIG. 4, there is shown an embodiment of the present invention which eliminates streak artifacts from a photodetected image. In the configuration of collector 34 shown in FIG. 2, dirt can enter light collection cavity 38 through slot 35 and build up on the surface area 100 of member 40 where transmitted light first strikes after passing through film 10. At the point light strikes, the unscattered light beam is diverging and, in one embodiment, may be approximate 0.5 mm in diameter. Consequently, although very small dirt particles will not cause a noticeable fluctuation in detected light intensity as the beam traverses them, larger dirt particles will result in a streak artifact in the detected image since the reflectivity of the dirt is normally different than the reflectivity of diffuse reflective surfaces 42 and 44.

According to the embodiment shown in FIG. 4, member 40' has slanted light impingement face 102 located above lower face 100' where dirt tends to accumulate by cascading off the face. Thus, streak artifacts are minimized since light reflected from dirt which may accumulate on face 100' is not directly transmitted light but multiply reflected light. Thus the effects of reflectivity differences between diffuse reflective surfaces 42' and 44' and large dirt particles is minimized.

Figure 5:
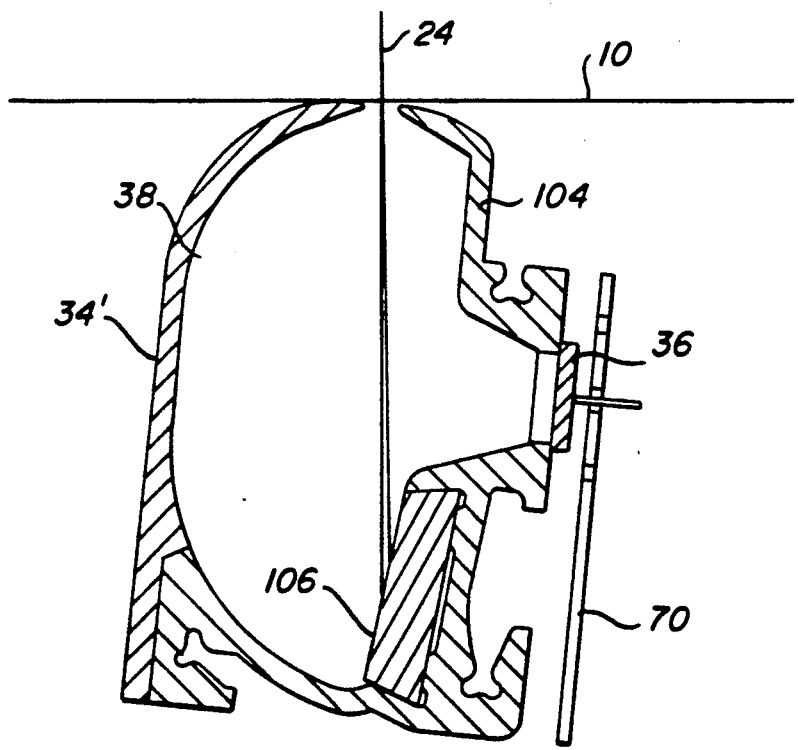

Referring now to FIGS. 5 and 6, there is shown another embodiment of the present invention. As shown, collector 34' includes an extrudable member 104 having a removable, elongated insert 106. Insert 106 is made of a low adhesion material such as fluorocarbon. Alternatively, insert 106 may have a film or layer of low adhesion material facing the collection cavity. Insert 106 may be easily removed from collector 34' for cleaning without the need for disassembling the entire collector 34'.

As shown in FIG. 6, insert 106 projects through slot 108 in end cap 110 for easy removal and insertion into collector 34'.

INDUSTRIAL APPLICABILITY AND ADVANTAGES

The light collector of the present invention has industrial applicability in laser scanning apparatus, such as radiographic film digitizers. The diffuse light collector of the present invention has high light collection efficiency, blocks scattered transmitted light from directly impinging on photodetectors, and reduces streak artifacts in a detected image caused by dirt accumulation in the collection cavity.

What is claimed is:

1. In a laser scanning apparatus, including means for scanning a laser beam across a substantially horizontally directed scanning region and means for translating an information medium through said scanning region, a diffuse light collector located below and adjacent to said scanning region for receiving light transmitted through said information medium, said collector comprising:
    a horizontally disposed, hollow collector member extending the length of said scanning region, having diffusely reflecting interior surfaces forming a diffusely reflecting light cavity and having an elongated slot adjacent to said laser scanning region for receiving light from said information medium into said cavity, wherein said hollow member has a slanted light impingement opposite said slot and a lower region below said face, whereby dirt which falls into said cavity through said slot, cascades off of said face into said lower region; and
    a photodetector communicating with said collector cavity for detecting light received into and diffusely reflected by said light cavity.

2. The collector of claim 1 including a removable insert forming said slanted light impingement face of said collector member, said insert being of a low adhesion material.

3. The collector of claim 2 wherein said insert is of fluorocarbon material.

* * * * *